(12) United States Patent
Kang et al.

(10) Patent No.: US 12,092,873 B2
(45) Date of Patent: Sep. 17, 2024

(54) OPTICAL FIBER COUPLER

(71) Applicant: ELECTRONICS AND TELECOMMUNICATIONS RESEARCH INSTITUTE, Daejeon (KR)

(72) Inventors: Sae-Kyoung Kang, Daejeon (KR); Joon Young Huh, Daejeon (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 28 days.

(21) Appl. No.: 17/587,194

(22) Filed: Jan. 28, 2022

(65) Prior Publication Data

US 2022/0326444 A1 Oct. 13, 2022

(30) Foreign Application Priority Data

Apr. 13, 2021 (KR) .................. 10-2021-0047890
Jul. 12, 2021 (KR) .................. 10-2021-0091094

(51) Int. Cl.
*G02B 6/30* (2006.01)

(52) U.S. Cl.
CPC .................................... *G02B 6/30* (2013.01)

(58) Field of Classification Search
CPC ...... G02B 6/30; G02B 6/4215; G02B 6/4246; G02B 6/4249; G02B 6/4446
See application file for complete search history.

(56) References Cited

U.S. PATENT DOCUMENTS

| | | | |
|---|---|---|---|
| 7,802,927 B2 | 9/2010 | Benjamin et al. | |
| 8,320,763 B2 | 11/2012 | Kim et al. | |
| 9,042,691 B2 | 5/2015 | Kang et al. | |
| 9,813,152 B2 | 11/2017 | Pinguet et al. | |
| 11,054,593 B1* | 7/2021 | Chua | G02B 6/4278 |
| 2007/0237449 A1* | 10/2007 | Aoki | G02B 6/4292 |
| | | | 385/14 |
| 2014/0177995 A1* | 6/2014 | Mohammed | G02B 6/1228 |
| | | | 385/79 |
| 2014/0193114 A1* | 7/2014 | Ooba | G02B 6/42 |
| | | | 385/14 |

FOREIGN PATENT DOCUMENTS

| | | |
|---|---|---|
| JP | 2014-134689 A | 7/2014 |
| JP | 2015-125286 A | 7/2015 |
| KR | 10-0487216 B1 | 5/2005 |
| KR | 10-0801519 B1 | 2/2008 |

* cited by examiner

*Primary Examiner* — Michael P Mooney
(74) *Attorney, Agent, or Firm* — LRK PATENT LAW FIRM

(57) ABSTRACT

An optical fiber coupler includes a plurality of optical fibers parallel to each other in a first direction, an optical fiber array block (FAB) configured to maintain a constant center-to-center distance between the plurality of optical fibers, and an optical waveguide block including a plurality of optical waveguides coupled to the plurality of optical fibers, respectively, and configured to transfer optical signals transmitted through the plurality of optical fibers connected to the optical FAB in a second direction in which a photonics chip is placed and which is different from the first direction.

9 Claims, 7 Drawing Sheets

OPTICAL FIBER COUPLER

CROSS-REFERENCE TO RELATED APPLICATIONS

This application claims the benefit of Korean Patent Application No. 10-2021-0047890 filed on Apr. 13, 2021, and Korean Patent Application No. 10-2021-0091094 filed on Jul. 12, 2021, in the Korean Intellectual Property Office, the entire disclosures of which are incorporated herein by reference for all purposes.

BACKGROUND

1. Field of the Invention

One or more example embodiments relate to a structure of an optical fiber coupler used in an optical input/output unit of an optical transceiver.

2. Description of Related Art

An optical transceiver is a module that receives electrical signals and modulates the electrical signals into optical signals and receives optical signals and converts the optical signals into electrical signals, and performs optical connection for high-speed signal transmission in a data center network. As the amount of data to be transmitted through the optical transceiver increases, an optical transmitter and an optical receiver which are core blocks are required to be faster, smaller, and lower in cost.

An optical module for the optical transmitter and the optical receiver may be implemented by integrating an optical device and an electronic device in a limited space. For high integration, silicon photonics technology and heterogeneous integration technology of multi-channel array optical transmission and reception chips are being considered. The present disclosure relates to an optical fiber coupler used for an optical input/output unit for optical connection (optical interface) to the outside in an optical transceiver.

An optical fiber coupler according to a related art is formed by applying technology of directly bending multiple optical fibers using a structure bent at a certain angle. An allowable minimum bending radius of a general single-mode optical fiber may have a value of about 10 mm. Accordingly, light intensity loss occurs in a bent portion of an optical fiber that is less than the recommended radius of curvature through the above-described technology.

For this reason, the optical fiber coupler according to the related art may have a relatively large size in a vertical direction, and when a center distance (pitch) between channels is large in a configuration of an optical input/output unit having a plurality of channels in a large-capacity photonics chip, the optical fiber coupler has a disadvantage of becoming large even in a horizontal direction.

SUMMARY

Example embodiments provide a structure of an optical fiber coupler that does not affect a size of the optical fiber coupler by forming a plurality of optical waveguide patterns with a specific angle such that one side of a PLC optical waveguide is optically coupled at a certain angle using silica-based planar lightwave circuit (PLC) technology, by providing a structure in which a plurality of optical fibers connected in a 1:1 correspondence to the formed PLC optical waveguide on the other side is connected, and by providing a pitch transform for a distance between channels optically coupled between the PLC optical waveguide and a photonics chip.

In addition, the present disclosure provides a structure of an optical fiber coupler capable of achieving multifunctionality, miniaturization, and low cost by integrating functional devices such as an optical splitter, an optical combiner, an optical multiplexer, and an optical demultiplexer in a PLC optical waveguide to which silica-based PLC technology is applied to reduce the number of optical fibers of the optical fiber coupler used in an optical transceiver.

According to an aspect, there is provided an optical fiber coupler including a plurality of optical fibers parallel to each other in a first direction, an optical fiber array block (FAB) configured to maintain a constant center-to-center distance between the plurality of optical fibers, and an optical waveguide block including a plurality of optical waveguides coupled to the plurality of optical fibers, respectively, and configured to transfer optical signals transmitted through the plurality of optical fibers connected to the optical FAB in a second direction in which a photonics chip is placed and which is different from the first direction.

The optical waveguide block may be formed using a silica-based PLC.

The optical waveguide block may be formed to have a structure in which the optical waveguides are stacked.

When the optical signals are transmitted through a silicon-based photonics chip, the optical waveguides of the optical waveguide block may be bent at a specific angle such that the optical signals are optically coupled using a surface optical coupler of the silicon-based photonics chip.

When the optical signals are transmitted through a photonics chip including a compound-based optical device, the optical waveguides of the optical waveguide block may be perpendicularly bent such that the optical signals are coupled optically and vertically to the photonics chip.

The optical waveguide block may include optional waveguides for alignment to optically couple the optical signals to the photonics chip.

The optical waveguide block may be mounted on the photonics chip in a surface direction perpendicular to a surface to which the optical FAB is connected to optically couple the optical signals to the photonics chip.

According to another aspect, there is provided an optical fiber coupler including a plurality of optical fibers parallel to each other in a first direction, an optical FAB configured to maintain a constant center-to-center distance between the plurality of optical fibers, and an optical waveguide block including a plurality of optical waveguides coupled to the plurality of optical fibers, respectively, and configured to transfer optical signals transmitted through the plurality of optical fibers connected to the optical FAB in a second direction in which a photonics chip is placed and which is different from the first direction, wherein an optical splitter or an optical combiner is integrated into the optical waveguides of the optical waveguide block to divide an optical signal received through any one of the optical fibers into a plurality of optical signals and transmit the plurality of optical signals to the photonics chip or to combine the plurality of optical signals received by the photonics chip and transmit the combined optical signals to any one of the optical fibers.

The optical waveguide block may be formed using a silica-based PLC.

The optical waveguide block may be formed to have a structure in which the optical waveguides are stacked.

When the optical signals are transmitted through a silicon-based photonics chip, the optical waveguides of the optical waveguide block may be bent at a specific angle such that the optical signals are optically coupled using a surface optical coupler of the silicon-based photonics chip.

When the optical signals are transmitted through a photonics chip including a compound-based optical device, the optical waveguides of the optical waveguide block may be perpendicularly bent such that the optical signals are coupled optically and vertically to the photonics chip.

The optical waveguide block may include optional waveguides for alignment to optically couple the optical signals to the photonics chip.

According to another aspect, there is provided an optical fiber coupler including a plurality of optical fibers parallel to each other in a first direction, an optical FAB configured to maintain a constant center-to-center distance between the plurality of optical fibers, and an optical waveguide block including a plurality of optical waveguides coupled to the plurality of optical fibers, respectively, and configured to transfer optical signals transmitted through the plurality of optical fibers connected to the optical FAB in a second direction in which a photonics chip is placed and which is different from the first direction, wherein an optical multiplexer or an optical demultiplexer is integrated into the optical waveguide block to demultiplex, for each channel, an optical signal which is received through one of the optical fibers and in which a plurality of wavelengths are multiplexed and transmit the demultiplexed optical signal to the photonics chip or to multiplex wavelengths of a plurality of channels received by the photonics chip and transmit the multiplexed wavelengths to the one of the optical fibers.

The optical waveguide block may be formed using a silica-based PLC.

The optical waveguide block may be formed to have a structure in which the optical waveguides are stacked.

When the optical signals are transmitted through a silicon-based photonics chip, the optical waveguides of the optical waveguide block may be bent at a specific angle such that the optical signals are optically coupled using a surface optical coupler of the silicon-based photonics chip.

When the optical signals are transmitted through a photonics chip including a compound-based optical device, the optical waveguides of the optical waveguide block may be perpendicularly bent such that the optical signals are coupled optically and vertically to the photonics chip.

The optical waveguide block may include optional waveguides for alignment to optically couple the optical signals to the photonics chip.

Additional aspects of example embodiments will be set forth in part in the description which follows and, in part, will be apparent from the description, or may be learned by practice of the disclosure.

According to example embodiments, the size of the optical fiber coupler may not be affected by forming an optical waveguide pattern with a specific angle such that one side of a PLC optical waveguide is optically coupled at a certain angle using silica-based PLC technology and providing a structure in which a plurality of optical fibers connected in a 1:1 correspondence to the formed PLC optical waveguide on the other side is connected, thereby providing a pitch transform for a distance between channels optically coupled between the PLC optical waveguide and a photonics chip.

In addition, example embodiments provide a structure that optically couples with a photonics chip not in a direction (horizontal direction) in which a PLC optical waveguide is formed but in a surface (lateral direction) perpendicular to a surface to which an optical FAB is connected, and thus, a plurality of optical fibers coupled in a 1:1 correspondence to the optical waveguide are arranged in a vertical direction in the optical fiber coupler.

In addition, example embodiments may provide a structure of an optical fiber coupler capable of achieving multi-functionality, miniaturization, and low cost by integrating functional devices such as an optical splitter, an optical combiner, an optical multiplexer, and an optical demultiplexer into a PLC optical waveguide to which silica-based PLC technology is applied to reduce the number of optical fibers of the optical fiber coupler used in an optical transceiver.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments of the present disclosure are described in detail with reference to the accompanying drawings.

Figure 1:
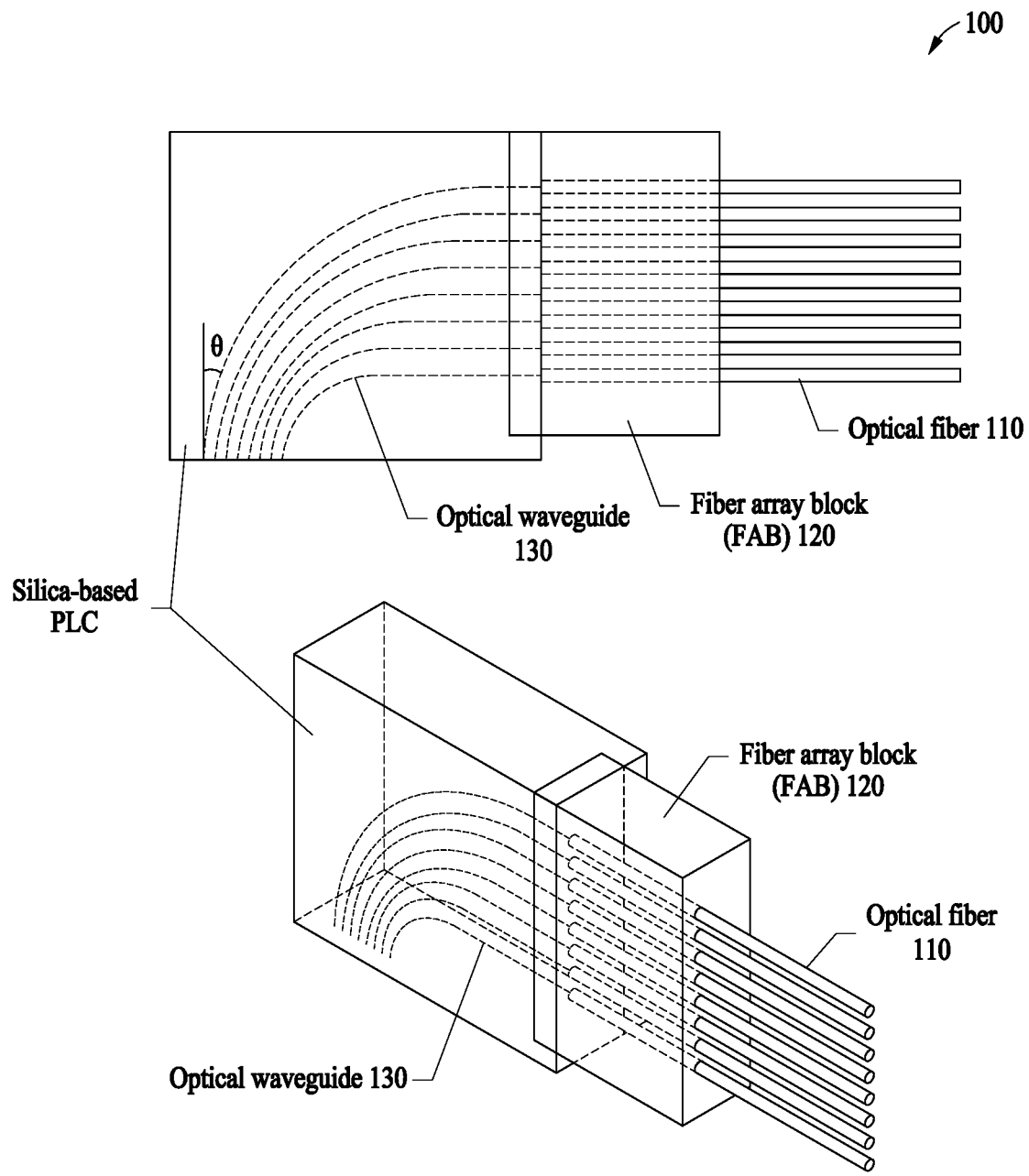
FIG. 1 is a diagram illustrating a first structure of an optical fiber coupler according to an example embodiment.

FIG. 1 is a view illustrating a first structure of an optical fiber coupler according to an example embodiment.

FIG. 1 illustrates an optical fiber coupler 100 using silica-based PLC technology. The optical fiber coupler 100 may include a plurality of optical fibers 110, an optical fiber array block (FAB) 120 that maintains a constant center-to-center distance between the plurality of optical fibers 110, and an optical waveguide block including a plurality of planar lightwave circuit (PLC) optical waveguides 130 bent at a preset angle ($\theta$) using silica-based PLC technology.

In this case, each of the PLC optical waveguides 130 constituting the optical waveguide block may be changed in an allowable radius of curvature for preventing bending loss according to a refractive index difference ($\Delta$) between constituent materials with respect to a core and a clad used in a lithography process of the silica-based PLC technology. More specifically, as the refractive index difference increases, bending loss is reduced, and thus, sizes of the PLC optical waveguides 130 may also be reduced. For example, when the refractive index difference is 2%, an allowable radius of curvature may be about 1 mm. Of course, a lithography process therefor may be implemented to be less than this, but more bending loss may occur as a result.

Meanwhile, the optical fiber coupler 100 may be optically coupled to a photonics chip at a preset angle θ (θ≠0°) or perpendicularly (θ≠0°) through the PLC optical waveguides 130. For example, when the optical fiber coupler 100 including the PLC optical waveguides 130 bent at the preset angle θ as illustrated in FIG. 1 is optically coupled to a silicon photonics chip, the optical fiber optical coupler 100 may be optically coupled with a slight offset angle θ rather than a perpendicular angle (θ=0°) through a surface optical coupler placed on the silicon photonics chip. In this case, the surface optical coupler may be a grating coupler, but this is only an example and the surface optical coupler is not limited thereto.

In general, the silicon photonics chip is optically coupled at a preset angle of about 8° to about 10° to the surface optical coupler, and the optical fiber coupler 100 according to the present disclosure may be applied to a structure in which optical coupling is performed at the preset angle θ in addition to the silicon photonics chip.

On the other hand, when the optical fiber coupler 100 is optically coupled to a compound-based optical device such as a laser diode (LD) that is a light transmission device, and a photodiode (PD) that is a light reception device, the optical fiber coupler 100 may be coupled optically and perpendicularly (θ=0°) to corresponding optical devices.

As described above, the present disclosure implements the plurality of PLC optical waveguides 130 having a desired preset angle (θ) and an accurate position (optical waveguide channel interval) through the lithography process of the silica-based PLC technology, and then the PLC optical waveguides 130 and the plurality of optical fibers 110 are optically coupled to each other using the optical FAB 120, and thereby, the optical fiber coupler 100 may be implemented.

Meanwhile, when the plurality of optical fibers 110 are coupled to the optical fiber coupler 100, a center-to-center distance between the optical fibers 110 may be implemented as a distance of 250 μm to generally match the standard of a ribbon optical fiber. Meanwhile, when the ribbon optical fiber is not used, the optical FAB 120 having the smallest center-to-center distance of 127 μm of the plurality of optical fibers 110 may be used. An external shape of the optical fiber coupler 100 may have variously changed depending on a structure of an optical input/output unit of an optical transceiver.

Figure 2:
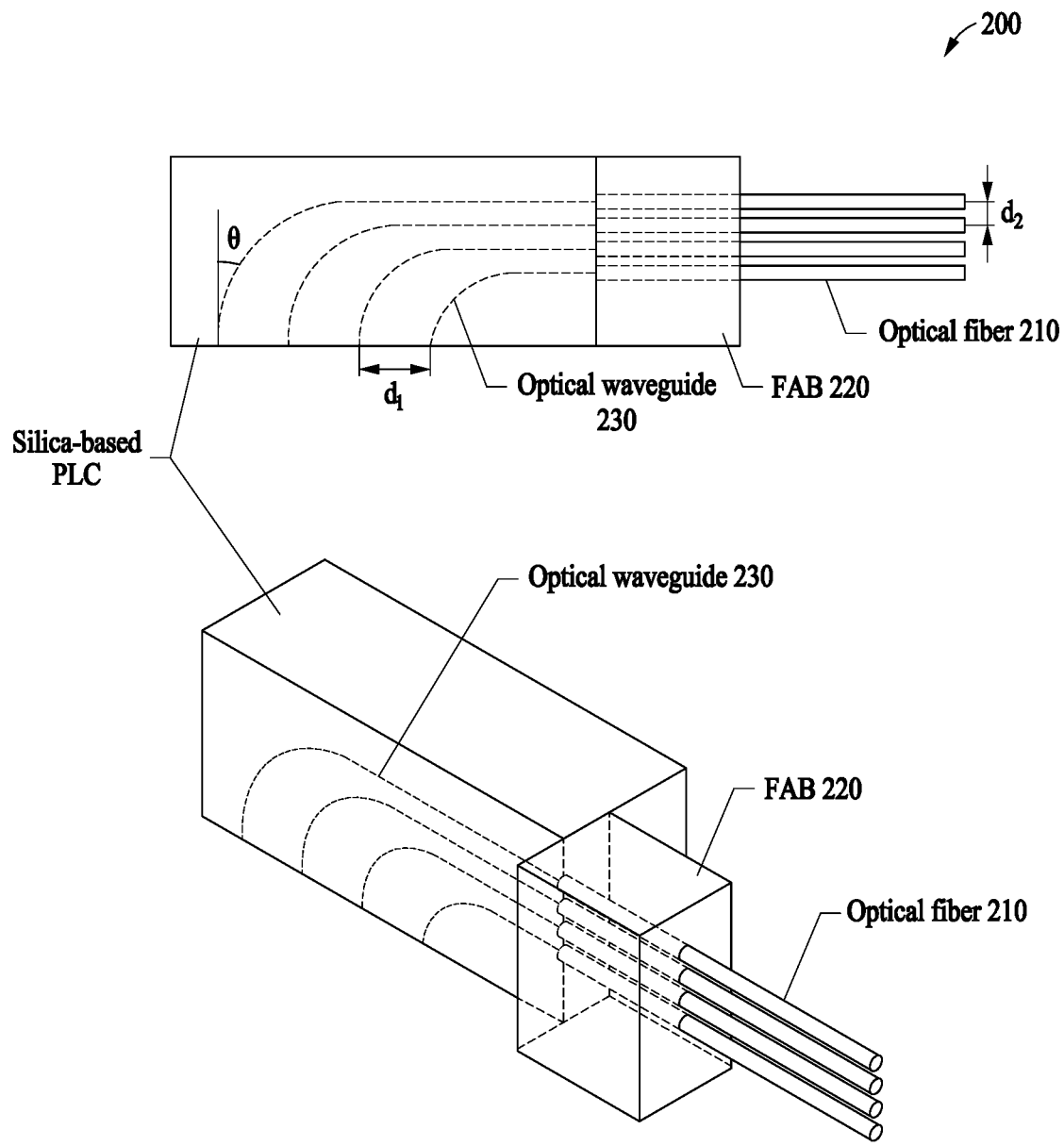
FIG. 2 is a diagram illustrating a second structure of an optical fiber coupler according to an example embodiment.

FIG. 2 is a view illustrating a second structure of an optical fiber coupler according to an example embodiment.

FIG. 2 illustrates an optical fiber coupler 200 using silica-based PLC technology. The optical fiber coupler 200 may include a plurality of optical fibers 210, an optical FAB 220 that maintains a constant center-to-center distance between the plurality of optical fibers 210, and an optical waveguide block including a plurality of PLC optical waveguides 230 bent at a preset angle (θ) using silica-based PLC technology.

In this case, a difference between the optical fiber coupler 200 and the optical fiber coupler 100 illustrated in FIG. 1 is a channel-to-channel center distance (pitch) d1 between the plurality of PLC optical waveguides 230 that are formed on the side and optically coupled to a photonics chip. In this way, the channel-to-channel center distance between the PLC optical waveguides 230 optically coupled to the photonics chip may be extended from the smallest distance (about 10 μm level) to the largest distance (several mm level) by considering a lithography process and characteristics of the PLC optical waveguides 230.

However, the optical fiber coupler 200 according to the present disclosure has an advantage in that the channel-to-channel center distance d1 between the PLC optical waveguides 230 optically coupled to the photonics chip may be freely reduced and expanded, while a channel-to-channel center distance d2 between the plurality of optical fibers 210 optically coupled to the PLC optical waveguides 230 is 127 μm or 250 μm (ribbon optical fiber standard) and may be implemented at the same level as the optical fiber coupler 100 illustrated in FIG. 1. In other words, there is an advantage that the channel-to-channel center distance d1 between the PLC optical waveguide 230 does not affect the channel-to-channel center distance d2 between the optical fibers 210 coupled in 1:1 correspondence to the PLC optical waveguides 230.

In other words, the related art has a disadvantage that, as the channel-to-channel center distance d1 between portions optically coupled to a photonics chip is increased, the channel-to-channel center distance d2 between optical fibers is increased, and thus, a size of an optical coupler is increased in a horizontal direction.

However, in the optical fiber coupler 200 proposed in the present disclosure, only the channel-to-channel center distance d1 between the PLC optical waveguides 230 optically coupled to a photonics chip is increased or reduced, and a portion in which the PLC optical waveguides 230 are connected to the optical fibers 210 may have an existing channel-to-channel center distance d2 (127 um or 250 um) without a change therein.

The optical fiber coupler 200 illustrated in FIG. 2 may be applied an optical coupling application field described in FIG. 1 in the same manner. An external shape of the optical fiber coupler 200 may be variously changed depending on a structure of an optical input/output unit of an optical transceiver.

In addition, although the silica-based PLC optical waveguide 230 applied to the proposed optical fiber coupler 200 is shown to consist of only one layer in FIG. 2, if the number of optical coupling channels is increased, the PLC optical waveguides 230 may be implemented to have stacked waveguide layers in a lithography process. In addition, the optical fibers 210 may also be implemented by being two-dimensionally arranged to correspond to the stacked waveguide layers of the PLC optical waveguides 230.

Figure 3:
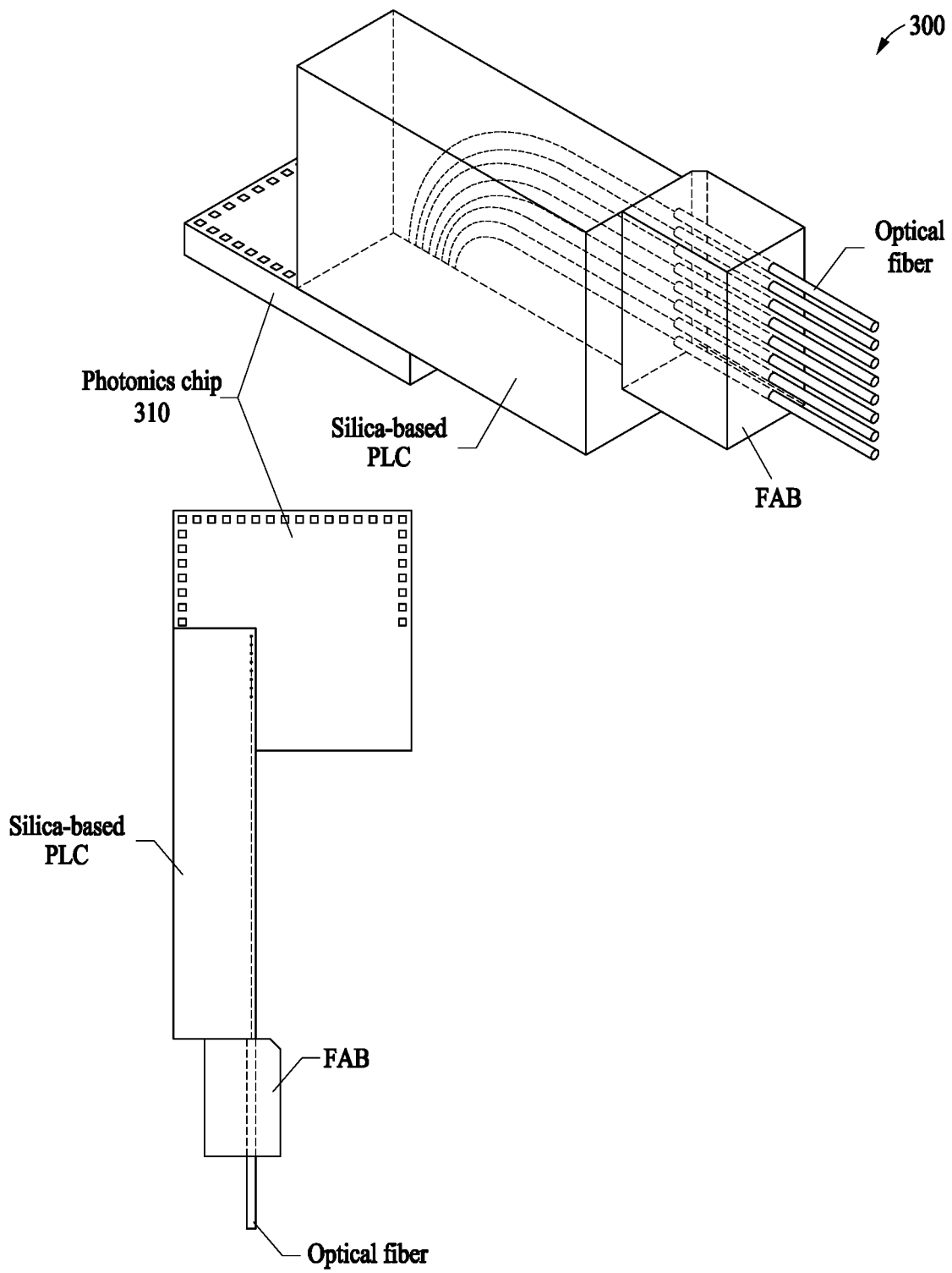
FIG. 3 is a diagram illustrating a first example in which an optical fiber coupler is applied to an optical input/output unit of a photonics chip, according to an example embodiment.

FIG. 3 is a view illustrating a first example in which an optical fiber coupler is applied to an optical input/output unit of a photonics chip, according to an example embodiment.

Referring to FIG. 3, a surface (lateral direction) of an optical fiber coupler 300 may be connected to a surface which is perpendicular to the surface and in which an optical input/output unit of the photonics chip 310 is connected to the optical FAB. In the present disclosure, the photonics chip 310 may be a silicon photonics chip or an optical transmission/reception integration module including a compound-based optical device. In this case, when the photonics chip 310 is the silicon photonics chip, the optical fiber coupler 300 may be optically coupled to a surface optical coupler placed on the silicon photonics chip at a preset angle (θ) having a slight offset which is not perpendicular to the surface optical coupler. Accordingly, in this case, a PLC optical waveguide may be formed in a silica-based PLC process such that the optical fiber coupler 300 is optically coupled to the silicon photonics chip at the preset angle θ.

Unlike this, when the photonics chip 310 is the optical transmission/reception integration module including the compound-based optical device, the optical fiber coupler 300 may be optically coupled to an optical device placed in the optical transmission/reception integration module in a vertical direction. In this case, when the optical device placed in the optical transmission/reception integration module is for optical transmission, the optical device may be a light source chip or a light source block from which an optical signal may be vertically output. A vertically emitting light source chip may include a generally known vertical-cavity surface-emitting laser (VCSEL). In contrast to this, when the optical device placed in the optical transmission/reception integration module is for optical reception, the optical device may be a vertical (surface) incident-type photodiode into which an optical signal may be vertically incident.

Although not illustrated in detail in FIG. 3, a channel-to-channel center distance between PLC optical waveguides optically coupled to the photonics chip 310 may be implemented with various distances depending on a configuration of an optical input/output unit of the photonics chip 310, and an external shape of the optical fiber coupler 300 may be variously changed depending on a structure of the optical input/output unit of an optical transceiver.

Figure 4:
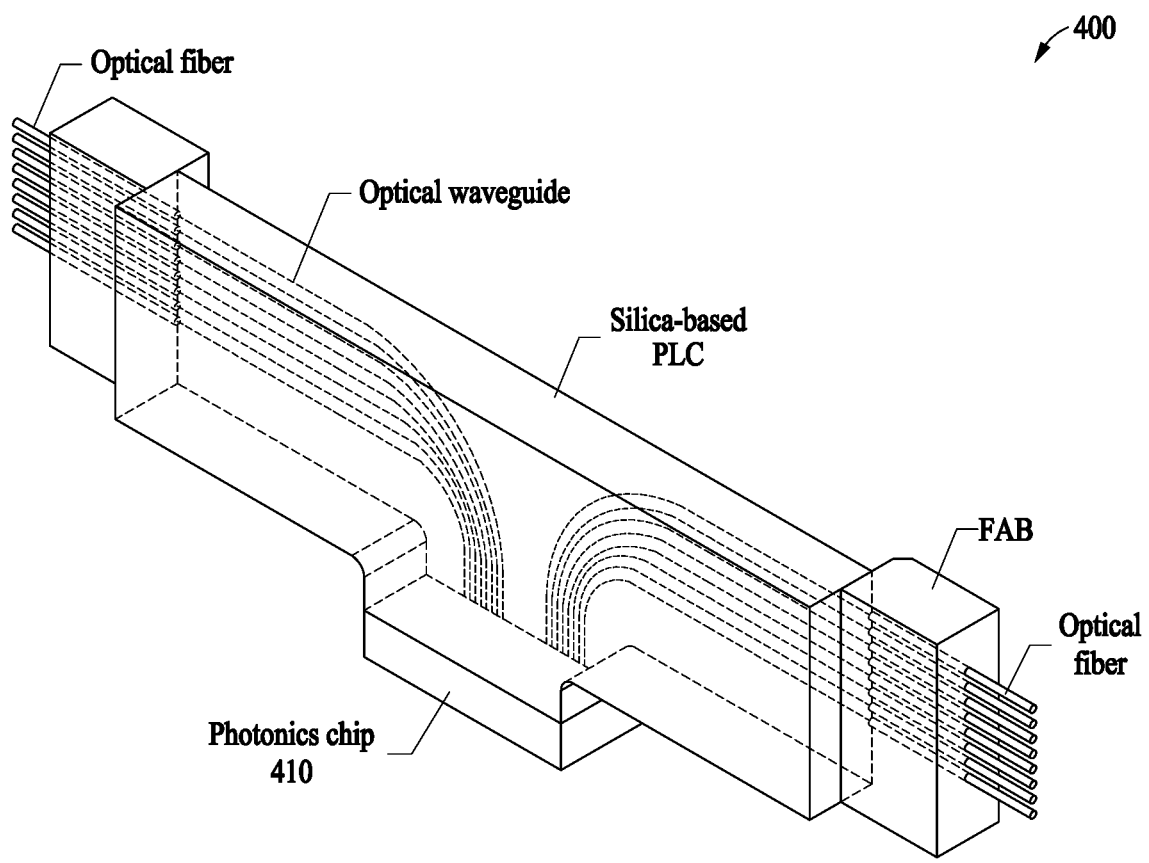
FIG. 4 is a diagram illustrating a second example in which an optical fiber coupler is applied to an optical input/output unit of a photonics chip, according to an example embodiment.

FIG. 4 is a view illustrating a second example in which an optical fiber coupler is applied to an optical input/output unit of a photonics chip, according to an example embodiment.

FIG. 4 is an extension of the structure of the optical fiber coupler 300 illustrated in FIG. 3 and illustrates a structure in which optical fibers formed on both sides of an optical fiber coupler 400 is optically coupled to a photonics chip 410. In this case, the photonics chip 410 may be a silicon photonics chip or an optical transmission/reception integration module including a compound-based optical device as described above.

The optical fiber coupler 400 illustrated in FIG. 4 may have a structure in which a plurality of optical fibers are connected to both sides, and an optical transmitter and an optical receiver may be connected in different directions. In this case, when the optical fiber coupler 400 is coupled to a silicon photonics-based optical transmitter, one side thereof may receive an optical transmission output signal, and the other side thereof may receive a light source (continuous light source, preset pulse light source, or so on) signal. The known technology may not be applied to the coupling structure illustrated in FIG. 4 due to spatial limitation of a photonics chip.

Although not illustrated in detail in FIG. 4, a channel-to-channel center distance between PLC optical waveguides 420 optically coupled to the photonics chip 410 may be implemented with various distances depending on a configuration of an optical input/output unit of the photonics chip 410, and an external shape of the optical fiber coupler 400 may be variously changed depending on a structure of an optical input/output unit of an optical transceiver.

Figure 5:
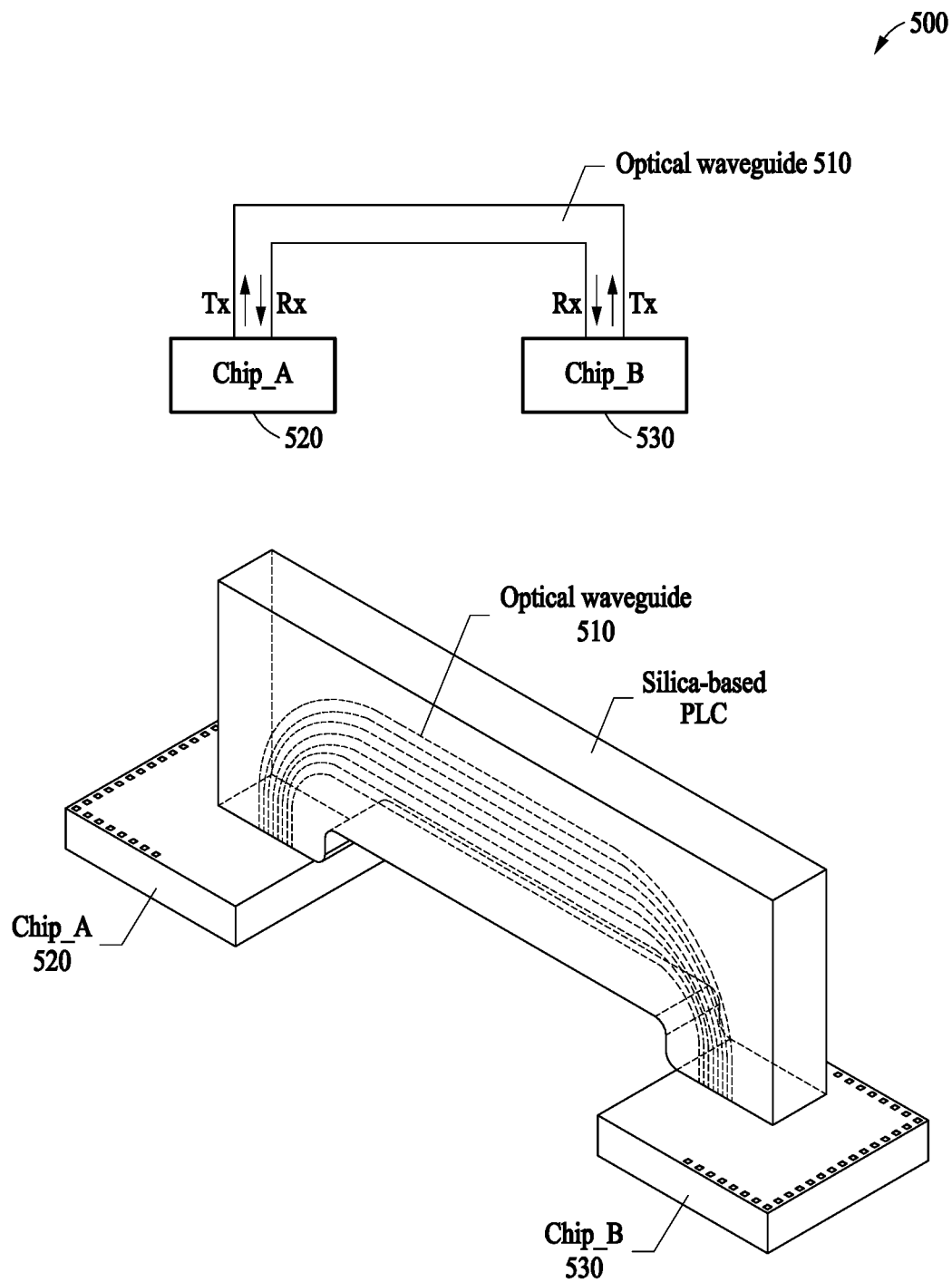
FIG. 5 is a diagram illustrating a third example in which an optical fiber coupler is applied to an optical input/output unit of a photonics chip, according to an example embodiment.

FIG. 5 is a view illustrating a third example in which an optical fiber coupler is applied to an optical input/output unit of a photonics chip, according to an example embodiment.

FIG. 5 illustrates a structure of an optical fiber coupler 500 in which a chip_A 520 is optically coupled to a chip_B 530 by a plurality of PLC optical waveguides 510. Here, the chip_A 520 and the chip_B 530 may each be a silicon photonics chip or an optical transmission/reception integration module including a compound-based optical device.

The plurality of PLC optical waveguides 510 constituting the optical fiber coupler 500 may include optical waveguides for optical transmission and optical waveguides for optical reception. In this case, the plurality of PLC optical waveguides 510 constituting the optical fiber coupler 500 may optically couple the chip_A 520 to the chip_B 530 under different conditions depending on types of the chip_A 520 and the chip_B 530.

For example, when each of the chip_A 520 and the chip_B 530 is the silicon photonics chips, the plurality of PLC optical waveguides 510 of the optical fiber coupler 500 may be optically coupled with surface optical couplers placed on the silicon photonics chips at a preset angle (θ) with a slight offset which is not perpendicular. Accordingly, in this case, the plurality of PLC optical waveguides 510 of the optical fiber coupler 500 may be formed in a silica-based PLC process so as to be optically coupled to the silicon photonics chips at the preset angle (θ).

Meanwhile, when each of the chip_A 520 and the chip_B 530 is the optical transmission/reception integration module including the compound-based optical device, the plurality of PLC optical waveguides 510 of the optical fiber coupler 500 may be formed to be optically coupled to optical devices placed in the optical transmission/reception integration modules in a vertical direction.

Meanwhile, the plurality of PLC optical waveguides 510 of the optical fiber coupler 500 illustrated in FIG. 5 may be coupled to the chip_A 520 and the chip_B 530 through a method for optical power monitoring, or through a manual alignment method using pattern recognition through optional optical waveguides for alignment (pattern recognizable optical waveguides by equipment).

Figure 6:
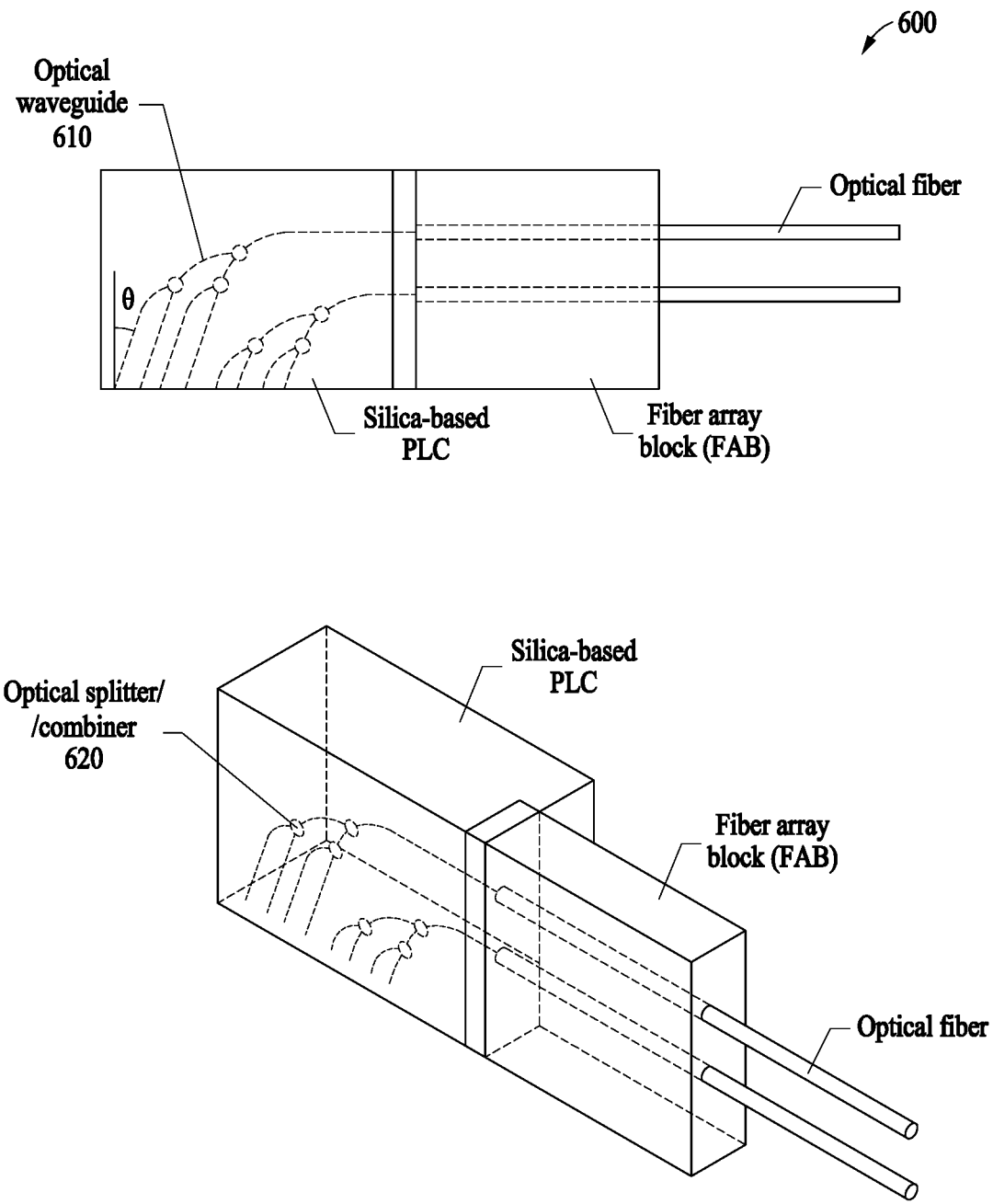
FIG. 6 is a diagram illustrating a structure of an optical fiber coupler to which an optical splitter/combiner is applied, according to an example embodiment.

FIG. 6 is a view illustrating a structure of an optical fiber coupler to which an optical splitter/combiner is applied, according to an example embodiment.

As illustrated in FIG. 6, an optical fiber coupler 600 may have a structure in which a plurality of optical fibers are arranged on one side thereof and optical splitter/combiners 620 are applied to silica-based PLC optical waveguides 610 coupled to the plurality of optical fibers in a 1:1 correspondence. In this case, the number of optical fibers and the number of the optical splitter/combiners 620 constituting the optical fiber coupler 600 may vary depending on structures of optical distribution and optical coupling.

In this case, a photonics chip may be a silicon photonics chip or an optical transmission/reception integration module including a compound-based optical device as described above, and the optical fiber coupler 600 may have an optical coupling structure under different conditions depending on types of the photonics chip coupled the PLC optical waveguides 610.

For example, when the photonics chip is the silicon photonics chip, a pattern of the PLC optical waveguides 610 may be formed such that the PLC optical waveguides 610 of the optical fiber optical coupler 600 are optically coupled to a surface optical coupler placed on the silicon photonics chip at a preset angle θ with a slight offset which is not perpendicular.

Unlike this, when the photonics chip is the optical transmission/reception integration module including the compound-based optical device, the PLC optical waveguides 610 of the optical fiber coupler 600 may be formed to be optically coupled to an optical device placed in the optical transmission/reception integration module in the vertical direction.

In this case, an optical splitter applied to the optical fiber coupler 600 may serve to divide a first optical signal applied through one optical fiber 620 into second optical signals of a plurality of channels. In this case, intensity of the second optical signals may be determined to correspond to the number of first optical signals split through the optical splitter.

Unlike this, an optical combiner applied to the optical fiber coupler 600 may serve to combine the second optical signals of a plurality of channels from the photonics chip and transmit the combined second optical signals to one optical fiber 620.

Figure 7:
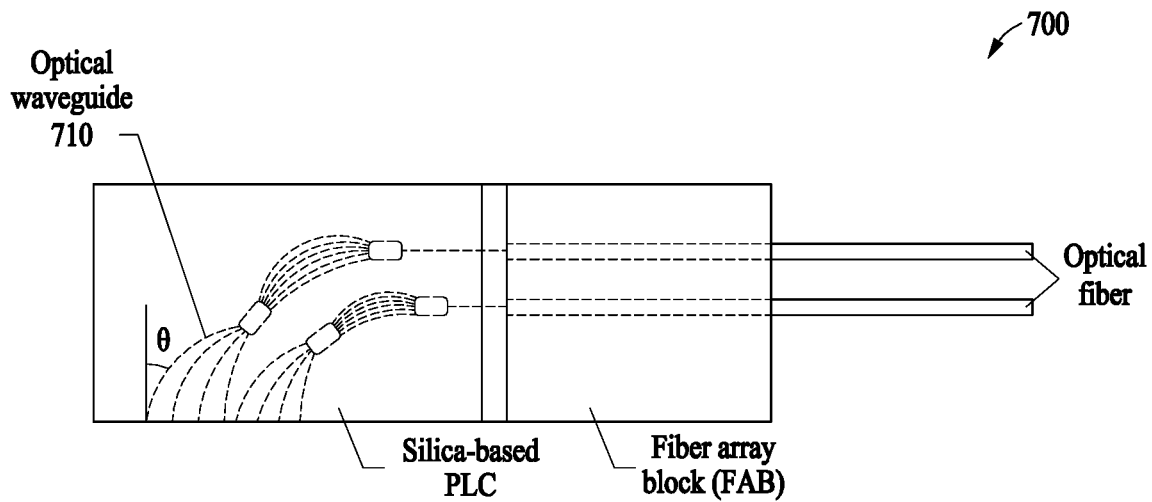
FIG. 7 is a diagram illustrating a structure of an optical fiber coupler to which an optical splitter/combiner is applied, according to an example embodiment.
Figure 7:
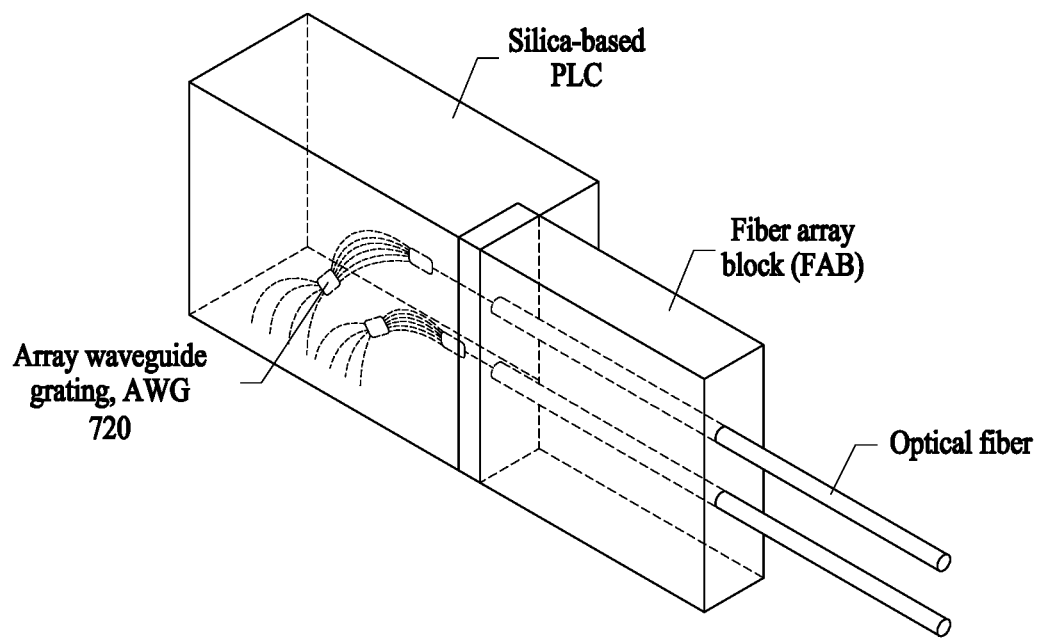

FIG. 7 is a view illustrating a structure of an optical fiber coupler to which an array waveguide grating is applied, according to an example embodiment.

As illustrated in FIG. 7, an optical fiber combiner 700 may include a plurality of optical fibers placed on one side and silica-based PLC optical waveguides 710 coupled in a 1:1 correspondence to the plurality of optical fibers to which a plurality of array waveguide gratings 720 are applied. In this case, the number of optical fibers and the number of array waveguide gratings 720 constituting the optical fiber coupler 700 may vary depending on structures of the array waveguide gratings.

Referring to FIG. 7, the optical fiber coupler 700 may have a structure in which the silica-based PLC optical waveguides 710 having array waveguide gratings applied thereto are optically coupled to a photonics chip. In this case, the photonics chip may be a silicon photonics chip or an optical transmission/reception integration module including a compound-based optical device as described above, and the PLC optical waveguides 710 of the optical fiber coupler 700 may be optically coupled to the photonics chip under different conditions depending on the type of the photonics chip.

For example, when the photonics chip is the silicon photonics chip, a pattern of the PLC optical waveguides 710 of the optical fiber coupler 700 may be formed to be optically coupled to a surface optical coupler placed on the silicon photonics chip at a preset angle ($\theta$) with a slight offset which is not perpendicular.

Meanwhile, when the photonics chip is the optical transmission/reception integration module including the compound-based optical device, the PLC optical waveguides 710 of the optical fiber coupler 700 may be formed to be optically coupled to an optical device placed in the optical transmission/reception integration module in the vertical direction.

In this case, an optical multiplexer applied to the optical fiber coupler 700 may wavelength-multiplex optical signals of different wavelengths applied to the PLC optical waveguides 710 for each channel (each wavelength) of the photonics chip into one PLC optical waveguide 710.

Meanwhile, an optical demultiplexer applied to the optical fiber coupler 700 may demultiplex the multiplexed optical signal of a plurality of wavelengths applied through one PLC optical waveguide 710 for each wavelength. As described above, the demultiplexed optical signals for each wavelength may be optically coupled to the photonics chip through the PLC optical waveguides 710 corresponding to respective channels.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

Meanwhile, a method according to the present disclosure may be implemented as a program that may be executed by a computer and stored in various recording media such as magnetic storage media, optical reading media, and digital storage media.

Various techniques described herein may be implemented by a digital electronic circuit, computer hardware, firmware, software, or a combination thereof. Implementations may be performed for processing by, or controlling an operation of, a data processing device such as a programmable processor, a computer, many computers, a computer program product, that is, an information carrier, for example, a machine readable storage (computer readable medium) or a computer program tangibly embodied in radio signals. The computer program described above may be written with any form of programming language including compiled or interpreted language and may be deployed in any form including a standalone program, a module, a component, a subroutine, or other units suitable for use in a computing environment. A computer program may be deployed to be processed by one computer or multiple computers at one site or distributed across multiple sites and interconnected by a communication network.

Processors suitable for processing a computer program may include, by way of example, both general and special purpose microprocessors, and any one or more processors of any kind of digital computer. In general, a processor may receive instructions and data from either read-only memory or random access memory or both. Elements of a computer may include at least one processor that executes instructions and one or more memory devices that store instructions and data. In general, a computer may include one or more mass storage devices that store data, for example magneto-optical disks or optical disks or may be coupled thereto to receive data therefrom, transmit data thereto, or both. Information carriers suitable for embodying computer program instructions and data may include, for example, semiconductor memory devices, magnetic media such as hard disks, floppy disks, and magnetic tapes, optical recording media such as compact disk read only memory (CD-ROM), a digital video disk (DVD), magneto-optical media such as floptical disks, read only memory (ROM), random access memory (RAM), flash memory, erasable programmable ROM (EPROM), electrically erasable programmable ROM (EEPROM), and so on. Processors and memories may be supplemented by or included in a special purpose logic circuit.

In addition, computer-readable media may be any available media that may be accessed by a computer and may include both computer storage media and transmission media.

While the present specification includes numerous specific implementation details, those should not be construed as limitations on the scope of any invention or claim but should be understood as descriptions of features that may be specific to particular embodiments of particular inventions. Certain features described herein in the context of separate embodiments may be implemented in combination in a single embodiment. Conversely, various features described in the context of a single embodiment may also be implemented in multiple embodiments, either individually or in any suitable sub-combination. Furthermore, although features operate in a particular combination and may be initially described as claimed as such, one or more features from a claimed combination may be excluded from the combination in some cases, and the claimed combination may be modified as a sub-combination or variant of a sub-combination.

Likewise, although operations are described in the drawings in a particular order, it should not be understood that all operations have to be performed in a preset or sequential order illustrated to achieve desirable results or all illustrated operations have to be performed. In certain cases, multitasking and parallel processing may be advantageous. In addition, separation of various device components of the above-described embodiments should not be understood as requiring such separation in all embodiments, and it should be understood that the program components and devices described above may generally be integrated together into a single software product or packaged into multiple software products.

Meanwhile, embodiments of the present disclosure disclosed in the present specification and drawings are merely presented as certain examples to aid understanding and are not intended to limit the scope of the present disclosure. It will be apparent to those skilled in the art to which the present disclosure pertains that other modifications based on the technical idea of the present disclosure may be implemented in addition to the embodiments disclosed herein.

What is claimed is:

1. An optical fiber coupler comprising:
    a plurality of optical fibers parallel to each other in a first direction;
    an optical fiber array block (FAB) configured to maintain a constant center-to-center distance between the plurality of optical fibers; and
    an optical waveguide block comprising a plurality of optical waveguides, the plurality of optical waveguides being coupled to the plurality of optical fibers, respectively, and configured to transfer optical signals transmitted through the plurality of optical fibers connected to the optical FAB in a second direction in which a photonics chip is placed and which is different from the first direction, wherein a channel-to-channel center distance d1 of the optical waveguides can be reduced or expanded without affecting the channel-to-channel center distance d2 between the optical fibers,
    wherein the optical waveguides of the optical waveguide block are formed in different forms depending on a type of the photonics chip.

2. The optical fiber coupler of claim 1, wherein the optical waveguide block is formed using a silica-based planar lightwave circuit (PLC).

3. The optical fiber coupler of claim 1, wherein the optical waveguide block is formed to have a structure in which the optical waveguides are stacked.

4. An optical fiber coupler comprising:
    a plurality of optical fibers parallel to each other in a first direction;
    an optical fiber array block (FAB) configured to maintain a constant center-to-center distance between the plurality of optical fibers; and
    an optical waveguide block comprising a plurality of optical waveguides coupled to the plurality of optical fibers, respectively, and configured to transfer optical signals transmitted through the plurality of optical fibers connected to the optical FAB in a second direction in which a photonics chip is placed and which is different from the first direction, wherein a channel-to-channel center distance d1 of the optical waveguides can be reduced or expanded without affecting the channel-to-channel center distance d2 between the optical fibers,
    wherein an optical splitter or an optical combiner is integrated into the optical waveguides of the optical waveguide block to divide an optical signal received through any one of the optical fibers into a plurality of optical signals and transmit the plurality of optical signals to the photonics chip, or to combine the plurality of optical signals received by the photonics chip and transmit the combined optical signals to one of the optical fibers,
    wherein the optical waveguides of the optical waveguide block are formed in different forms depending on a type of the photonics chip.

5. The optical fiber coupler of claim 4, wherein the optical waveguide block is formed using a silica-based planar lightwave circuit (PLC).

6. The optical fiber coupler of claim 4, wherein the optical waveguide block is formed to have a structure in which the optical waveguides are stacked.

7. An optical fiber coupler comprising:
    a plurality of optical fibers parallel to each other in a first direction;
    an optical fiber array block (FAB) configured to maintain a constant center-to-center distance between the plurality of optical fibers; and
    an optical waveguide block comprising a plurality of optical waveguides coupled to the plurality of optical fibers, respectively, and configured to transfer optical signals transmitted through the plurality of optical fibers connected to the optical FAB in a second direction in which a photonics chip is placed and which is different from the first direction, wherein a channel-to-channel center distance d1 of the optical waveguides can be reduced or expanded without affecting the channel-to-channel center distance d2 between the optical fibers,
    wherein an optical multiplexer or an optical demultiplexer is integrated into the optical waveguides of the optical waveguide block, to demultiplex, for each channel, an optical signal which is received through one of the optical fibers in which a plurality of wavelengths are multiplexed and transmit the demultiplexed optical signal to the photonics chip, or to multiplex wavelengths of a plurality of channels received from the photonics chip and transmit the multiplexed wavelengths to the one of the optical fibers,
    wherein the optical waveguides of the optical waveguide block are formed in different forms depending on a type of the photonics chip.

8. The optical fiber coupler of claim 7, wherein the optical waveguide block is formed using a silica-based planar lightwave circuit (PLC).

9. The optical fiber coupler of claim 7, wherein the optical waveguide block is formed to have a structure in which the optical waveguides are stacked.

* * * * *